(12) United States Patent
Fischer (10) Patent No.: US 11,067,312 B2
(45) Date of Patent: Jul. 20, 2021

(54) SOLAR ENERGY SYSTEM

(71) Applicants: TYLL SOLAR, LLC, Flemington, NJ (US); Jay D. Fischer, Flemington, NJ (US)

(72) Inventor: Jay D. Fischer, Flemington, NJ (US)

( * ) Notice: Subject to any disclaimer, the term of this patent is extended or adjusted under 35 U.S.C. 154(b) by 978 days.

(21) Appl. No.: 15/322,895

(22) PCT Filed: Jul. 2, 2015

(86) PCT No.: PCT/US2015/038942
§ 371 (c)(1),
(2) Date: Apr. 10, 2017

(87) PCT Pub. No.: WO2016/004276
PCT Pub. Date: Jan. 7, 2016

(65) Prior Publication Data
US 2019/0195535 A1    Jun. 27, 2019

Related U.S. Application Data

(60) Provisional application No. 62/020,948, filed on Jul. 3, 2014.

(51) Int. Cl.
*F24S 10/50* (2018.01)
*H02S 40/42* (2014.01)
(Continued)

(52) U.S. Cl.
CPC .......... *F24S 10/502* (2018.05); *F24S 10/503* (2018.05); *F24S 20/67* (2018.05); *F24S 50/40* (2018.05);
(Continued)

(58) Field of Classification Search
CPC .......... F24S 10/503; F24S 20/67; F24S 50/40; F24S 80/30; F24S 2020/17;
(Continued)

(56) References Cited

U.S. PATENT DOCUMENTS 314,945 A * 3/1885 Korting ............... F28F 3/12
                                                    165/168
659,450 A * 10/1900 McHenry ............ F25B 27/005
                                                    60/641.8
(Continued)

FOREIGN PATENT DOCUMENTS

CN    103174866 A    6/2013
CN    103262262 A    8/2013
(Continued)

OTHER PUBLICATIONS

Machine translation of CN103262262, uploades as "CN103262262_wipo_translate.pdf" GENERATED 2019 (Year: 2019).*
(Continued)

*Primary Examiner* — Avinash A Savani
*Assistant Examiner* — Martha M Becton
(74) *Attorney, Agent, or Firm* — Hoffmann & Baron, LLP (57) ABSTRACT

A modular, solar energy system comprising one or more modular solar panels. The solar panels include a pair of general planar, plates that are secured together to form a narrow channel therebetween for the circulation of a liquid. The solar panels have header assemblies affixed to opposite edges thereof and which control the entry of liquid into the channel and the exit therefrom. The inlet header assembly has a plurality of nozzles that are adjustable in size to control flow therethrough while the outlet header assembly has elongated nozzles to receive flow or liquid from the channel. The plates are preferably constructed of aluminum and one plate has a photovoltaic cell affixed thereto to face the sun and the other plate has a plurality of indentations that enhance the heat transfer characteristics with respect to the liquid flowing though the channel between the plates.

19 Claims, 8 Drawing Sheets

(51) Int. Cl.
*H02S 20/23* (2014.01)
*F24S 50/40* (2018.01)
*F24S 80/30* (2018.01)
*H02S 40/44* (2014.01)
*F24S 20/67* (2018.01)
*F24S 70/12* (2018.01)
*F24S 80/00* (2018.01)
*F24S 25/60* (2018.01)
*F24S 20/00* (2018.01)

(52) U.S. Cl.
CPC ............. *F24S 80/30* (2018.05); *H02S 20/23* (2014.12); *H02S 40/425* (2014.12); *H02S 40/44* (2014.12); *F24S 70/12* (2018.05); *F24S 2020/17* (2018.05); *F24S 2025/6011* (2018.05); *F24S 2080/03* (2018.05); *Y02B 10/10* (2013.01); *Y02B 10/20* (2013.01); *Y02B 10/70* (2013.01); *Y02E 10/44* (2013.01)

(58) Field of Classification Search
CPC ........... F24S 2025/6011; F24S 2080/03; F24S 70/12; H02S 20/23; H02S 40/425
See application file for complete search history.

(56) References Cited

U.S. PATENT DOCUMENTS

| | | | | |
|---|---|---|---|---|
| 695,136 A | * | 3/1902 | Baker | F24S 10/502 126/667 |
| 991,161 A | * | 5/1911 | McHenry | F24S 20/20 60/641.8 |
| 1,784,511 A | * | 12/1930 | Carns | E04C 2/326 52/574 |
| 2,146,845 A | * | 2/1939 | Payne | B60H 1/00042 454/75 |
| 2,427,262 A | * | 9/1947 | Delano | F24S 10/55 202/185.3 |
| 2,448,648 A | * | 9/1948 | Zideck | F24S 10/503 165/170 |
| 2,680,437 A | * | 6/1954 | Miller | F24S 10/25 126/649 |
| 2,969,586 A | * | 1/1961 | Victor | B21D 13/02 428/597 |
| 3,076,450 A | * | 2/1963 | Gough | F24S 10/503 126/672 |
| 3,145,707 A | * | 8/1964 | Thomason | F24S 70/60 126/675 |
| 3,215,134 A | * | 11/1965 | Thomason | F24S 10/504 126/670 |
| 3,399,664 A | * | 9/1968 | Suhay | F24S 10/503 126/709 |
| 3,513,828 A | * | 5/1970 | Masters | F24S 10/501 126/626 |
| 3,893,506 A | * | 7/1975 | Laing | E04B 1/806 165/236 |
| 3,918,430 A | * | 11/1975 | Stout | F24S 80/457 126/665 |
| 3,946,944 A | * | 3/1976 | Keyes | F24S 10/00 126/620 |
| 3,954,097 A | * | 5/1976 | Wilson, Jr. | F28D 7/12 126/656 |
| 3,965,887 A | * | 6/1976 | Gramer | F24S 10/503 126/666 |
| 3,995,615 A | * | 12/1976 | Hojnowski | F24S 10/503 126/670 |
| 4,007,728 A | * | 2/1977 | Guba | F24S 10/55 126/667 |
| 4,029,080 A | * | 6/1977 | Warren | F24S 20/67 126/643 |
| 4,031,881 A | * | 6/1977 | Thiel | F24S 10/504 126/664 |
| 4,036,209 A | * | 7/1977 | Press | F24S 10/60 202/234 |
| 4,037,583 A | * | 7/1977 | Bakun | F28D 20/0056 126/620 |
| 4,038,967 A | * | 8/1977 | Stout | F24S 80/457 126/679 |
| 4,055,163 A | * | 10/1977 | Costello | F24D 11/003 126/654 |
| 4,062,350 A | * | 12/1977 | Reed | F24S 70/25 126/666 |
| 4,062,351 A | * | 12/1977 | Hastwell | F24S 40/10 126/571 |
| 4,063,547 A | * | 12/1977 | Gruettner | F24S 10/55 126/623 |
| 4,076,013 A | * | 2/1978 | Bette | F24D 11/007 126/620 |
| 4,076,015 A | * | 2/1978 | Mattson | F24S 10/503 126/687 |
| 4,077,393 A | * | 3/1978 | Mattson | F24S 10/75 126/709 |
| 4,079,726 A | * | 3/1978 | Voelker | E04H 4/129 126/566 |
| 4,085,731 A | * | 4/1978 | Weir | F24S 23/30 126/634 |
| 4,092,977 A | * | 6/1978 | Gurtler | F24S 10/503 126/668 |
| 4,094,300 A | * | 6/1978 | Young | F24S 80/30 126/677 |
| 4,098,262 A | * | 7/1978 | Peters | F24D 11/007 126/647 |
| 4,106,479 A | * | 8/1978 | Rogers | F24S 23/00 126/687 |
| 4,111,186 A | * | 9/1978 | Ross | F24S 80/56 126/626 |
| 4,112,922 A | * | 9/1978 | Skinner | F24S 80/30 126/664 |
| 4,117,831 A | * | 10/1978 | Bansal | F24S 10/72 126/664 |
| 4,124,066 A | * | 11/1978 | Taylor | F01P 7/10 123/41.04 |
| 4,128,095 A | * | 12/1978 | Oren, III | F24S 70/10 126/675 |
| 4,135,490 A | * | 1/1979 | Soleau, Jr. | F24S 10/50 126/712 |
| 4,136,675 A | * | 1/1979 | Karasick | F24S 10/502 126/667 |
| 4,137,899 A | * | 2/1979 | Weslow | F24S 80/50 126/649 |
| 4,138,991 A | * | 2/1979 | Lorenz | F24S 40/80 126/713 |
| 4,150,661 A | * | 4/1979 | Trimboli Callegari | F24S 10/20 126/667 |
| 4,151,830 A | * | 5/1979 | Crombie | F24S 10/73 126/624 |
| 4,153,037 A | * | 5/1979 | Isaacson | F24S 10/502 126/623 |
| 4,154,222 A | * | 5/1979 | Yu | F24S 80/56 126/647 |
| 4,159,709 A | * | 7/1979 | Palazzetti | F24S 10/503 126/672 |
| 4,161,170 A | * | 7/1979 | Nicolaisen | F24S 10/75 126/271.1 |
| 4,161,809 A | * | 7/1979 | Severson | B21D 53/04 29/890.033 |
| 4,165,735 A | * | 8/1979 | Smith | F24S 10/503 126/638 |
| 4,170,220 A | * | 10/1979 | Smith | F24S 10/55 126/628 |
| 4,205,662 A | * | 6/1980 | Rhodes | F24S 10/73 126/672 |
| 4,210,122 A | * | 7/1980 | Artweger | F24S 20/69 126/622 |
| 4,223,665 A | * | 9/1980 | Lowe | F24S 70/65 126/674 |

(56) References Cited

U.S. PATENT DOCUMENTS

| | | | | |
|---|---|---|---|---|
| 4,237,865 A * | 12/1980 | Lorenz | E04B 1/74 | 126/599 |
| 4,243,021 A * | 1/1981 | Homsy | F24S 10/503 | 126/674 |
| 4,245,619 A * | 1/1981 | Ogilvie | F24S 10/503 | 126/668 |
| 4,248,212 A * | 2/1981 | Stevens | F24S 10/503 | 126/629 |
| 4,266,531 A * | 5/1981 | Behrendt | F24S 10/502 | 126/647 |
| 4,278,074 A * | 7/1981 | Uroshevich | F24S 10/503 | 126/666 |
| 4,279,240 A * | 7/1981 | Artusy | E06B 7/086 | 126/579 |
| 4,287,876 A * | 9/1981 | Jacques | F24S 80/30 | 126/624 |
| 4,290,412 A * | 9/1981 | Krauss | F24S 10/45 | 126/596 |
| 4,292,958 A * | 10/1981 | Lee | F24S 80/30 | 126/664 |
| 4,299,202 A * | 11/1981 | Mayo | F24S 10/503 | 126/649 |
| 4,313,421 A * | 2/1982 | Trihey | E04H 4/103 | 126/566 |
| 4,319,559 A * | 3/1982 | Hermann | F24S 10/50 | 126/676 |
| 4,327,708 A * | 5/1982 | Taylor | F24S 70/16 | 126/629 |
| 4,343,297 A * | 8/1982 | Figge | E04C 2/3405 | 126/647 |
| 4,345,586 A * | 8/1982 | Monjes | F24S 10/60 | 126/623 |
| 4,347,093 A * | 8/1982 | Mayo | F24S 20/67 | 156/242 |
| 4,348,442 A * | 9/1982 | Figge | B32B 3/30 | 428/72 |
| 4,369,210 A * | 1/1983 | Sakamoto | F24S 10/503 | 427/160 |
| 4,378,784 A * | 4/1983 | Frank | F24D 17/0068 | 126/584 |
| 4,383,959 A * | 5/1983 | Sadler | B28B 1/26 | 264/86 |
| 4,404,958 A * | 9/1983 | Boettcher | F24S 10/503 | 126/625 |
| 4,454,863 A * | 6/1984 | Brown | F24S 20/67 | 126/669 |
| 4,457,298 A * | 7/1984 | Eubank | F24S 10/00 | 126/632 |
| 4,473,064 A * | 9/1984 | Jacques | F24S 10/501 | 126/624 |
| 4,473,066 A * | 9/1984 | Clark | F24S 10/504 | 126/675 |
| 4,526,225 A * | 7/1985 | Stanton | E04B 1/74 | 165/104.11 |
| 4,574,876 A * | 3/1986 | Aid | A61M 5/44 | 165/170 |
| 4,660,545 A * | 4/1987 | Ely | F24S 50/40 | 126/563 |
| 4,731,072 A * | 3/1988 | Aid | A61M 5/44 | 604/408 |
| 4,737,140 A * | 4/1988 | Lee | A61M 1/3681 | 128/DIG. 3 |
| 4,777,935 A * | 10/1988 | Fricker | F03G 6/064 | 126/585 |
| 4,858,594 A * | 8/1989 | McCurdy | F24S 10/504 | 126/672 |
| 4,979,331 A * | 12/1990 | Tanaka | A01G 9/14 | 160/32 |
| 4,993,202 A * | 2/1991 | Thiel | E04F 15/02429 | 428/180 |
| 5,056,505 A * | 10/1991 | Warwick | A61H 9/0078 | 601/44 |
| 5,080,166 A * | 1/1992 | Haugeneder | F28F 13/06 | 165/56 |
| 5,161,520 A * | 11/1992 | Pitt | F24S 80/30 | 126/638 |
| 5,275,237 A * | 1/1994 | Rolfson | F28F 3/12 | 165/168 |
| 5,323,763 A * | 6/1994 | Lechner | F24S 10/501 | 126/626 |
| 5,911,205 A * | 6/1999 | Gambardella | F02B 27/00 | 123/184.35 |
| 5,944,010 A * | 8/1999 | Hoffschmidt | F03G 6/04 | 126/585 |
| 6,082,353 A * | 7/2000 | van Doorn | B21D 39/06 | 126/659 |
| 6,837,236 B1 * | 1/2005 | Lichtenberger | F24D 17/0021 | 126/634 |
| 6,939,599 B2 * | 9/2005 | Clark | B32B 3/30 | 428/178 |
| 6,943,678 B2 * | 9/2005 | Muirhead | B29C 51/02 | 340/505 |
| 7,752,980 B2 * | 7/2010 | Muirhead | G08B 13/2434 | 108/57.25 |
| 7,804,400 B2 * | 9/2010 | Muirhead | B29C 51/12 | 340/505 |
| 8,474,177 B2 * | 7/2013 | Griessen | A01G 9/243 | 47/17 |
| 8,585,850 B2 * | 11/2013 | Muirhead | B65D 19/0018 | 156/242 |
| 8,640,688 B2 * | 2/2014 | Kelly | F24S 20/67 | 126/623 |
| 8,757,144 B2 * | 6/2014 | Lalive | F24S 10/504 | 126/674 |
| 9,236,515 B2 | 1/2016 | Brottier et al. | | |
| 9,297,164 B2 * | 3/2016 | Collins | E04D 13/1606 | |
| 9,731,474 B2 * | 8/2017 | Pereira Da Cunha Ribeiro Valente | B32B 3/266 | |
| 9,829,215 B2 * | 11/2017 | Olalde | F24S 80/00 | |
| 2008/0248737 A1 * | 10/2008 | Liu | F24F 5/0046 | 454/237 |
| 2008/0289622 A1 | 11/2008 | Liu et al. | | |
| 2009/0025709 A1 * | 1/2009 | Bogdan | F24S 10/55 | 126/640 |
| 2009/0084430 A1 * | 4/2009 | Intrieri | H02S 40/44 | 136/246 |
| 2010/0132696 A1 * | 6/2010 | Lemaire | B21D 53/04 | 126/678 |
| 2010/0153312 A1 * | 6/2010 | Lemaire | B23P 15/26 | 705/500 |
| 2010/0224234 A1 * | 9/2010 | Fischer | F24D 11/0221 | 136/248 |
| 2011/0011087 A1 * | 1/2011 | Sorensen | F24S 10/503 | 60/641.8 |
| 2011/0088753 A1 | 4/2011 | Ahlgren et al. | | |
| 2011/0192393 A1 * | 8/2011 | Swift | F24S 10/72 | 126/663 |
| 2011/0197943 A1 * | 8/2011 | Pleva | F24S 40/20 | 136/244 |
| 2012/0129443 A1 * | 5/2012 | Bastow | F24F 13/12 | 454/258 |
| 2012/0145223 A1 * | 6/2012 | Weekley | F24S 10/503 | 136/248 |
| 2012/0222670 A1 * | 9/2012 | Dolphin | F24S 80/525 | 126/704 |
| 2012/0260909 A1 * | 10/2012 | Olalde | F24S 80/00 | 126/675 |
| 2013/0118479 A1 * | 5/2013 | Fourmigue | B21D 53/02 | 126/657 |
| 2013/0220310 A1 * | 8/2013 | Gregory | F24S 20/20 | 126/675 |
| 2013/0228167 A1 * | 9/2013 | Lemaire | F24S 80/30 | 126/674 |
| 2013/0333310 A1 * | 12/2013 | Damo | E04C 2/521 | 52/173.3 |
| 2014/0007919 A1 * | 1/2014 | Brottier | H01L 31/0521 | 136/246 |

(56) References Cited

U.S. PATENT DOCUMENTS

| | | | | |
|---|---|---|---|---|
| 2014/0338657 | A1* | 11/2014 | Marciel Filhno | F24S 80/30 126/652 |
| 2015/0020793 | A1* | 1/2015 | Llorente Folch | F24S 80/30 126/651 |
| 2015/0059277 | A1* | 3/2015 | Collins | E04D 13/1606 52/411 |
| 2015/0090432 | A1* | 4/2015 | Feron | B32B 37/1284 165/168 |
| 2016/0049902 | A1* | 2/2016 | Cristi Gonzalez | H02S 40/42 136/246 |
| 2016/0238281 | A1* | 8/2016 | Chibizov Chibizov | F24S 10/72 |
| 2017/0133974 | A1* | 5/2017 | Safir | H02S 40/38 |
| 2018/0234050 | A1* | 8/2018 | Schultz | H01L 31/048 |
| 2019/0056147 | A1* | 2/2019 | Brisebois | B23P 15/26 |

FOREIGN PATENT DOCUMENTS

| | | |
|---|---|---|
| ES | 2433257 A1 | 12/2013 |
| JP | 2002-130977 A | 5/2002 |
| WO | 93/15368 A1 | 8/1993 |
| WO | 2004/083556 A1 | 9/2004 |
| WO | 2010/129878 A2 | 11/2010 |

OTHER PUBLICATIONS

Sun, Gongliang; Wang, Liangbi; "Numerical Study of Interactions of Vortices Generated by Vortex Generators and Their Effects on Heat Transfer Enhancement," published in Numerical Heat Transfer Applications May 2006 (Year: 2006).*

Office Action for corresponding Australian Application No. 2015284003, dated Feb. 28, 2019, 4 pages.

International Search Report and Written Opinion for corresponding International Application No. PCT/US2015/038942, dated Sep. 17, 2015, 16 pages.

Office Action for corresponding European Application No. 15815149.8-1009, dated Nov. 23, 2018, 5 pages.

Office Action for corresponding Chinese Application No. 201580047567.7, dated Feb. 2, 2019, 11 pages (translation to English, 14 pages, including Search Report).

Office Action, Japanese Patent Application No. 2017-525509, dated Feb. 25, 2020, 10 pages.

* cited by examiner

SOLAR ENERGY SYSTEM

CROSS REFERENCE TO RELATED APPLICATIONS

The present application is a National Stage Application claiming the priority of PCT Application No. PCT/US2015/038942 filed Jul. 2, 2015, which in turn, claims priority from U.S. Provisional Application Ser. No. 62/020,948 filed Jul. 3, 2014. Applicants claim the benefits of 35 U.S.C. § 120 as to the PCT Application and priority under 35 U.S.C. § 119 as to the said U.S. Provisional application, and the entire disclosures of both applications are incorporated herein by reference in their entireties.

BACKGROUND OF THE INVENTION

The present invention is in the technical field of solar energy and, more particularly, the present invention is in the technical field of solar energy systems using solar panels for generating heat, hot water and/or electricity.

There are, at the present, solar energy systems employing solar panels that gather the radiant energy from the sun to either heat fluid circulating therethrough, generate electricity or both. An example of such solar panels is shown and described in U.S. patent application Ser. No. 12/660,646, filed Mar. 2, 2010 entitled "SOLAR ENERGY SYSTEM, published as U.S. Pub. 2010/0224234 and the specification and disclosure of that patent application is hereby incorporated in its entirety into the present patent application by reference As such, while the solar energy system and the individual modular solar panels of the aforedescribed patent application are entirely suitable for the purpose of providing heated water and/or electricity, the overall efficiency of such solar systems is critical in their use and thus any enhancement of the heat transfer characteristics of the solar energy system and solar energy panels is beneficial.

However, the cost of hybrid solar panels has been the primary reason for stagnancy in the market, so any improvement in design that would enable this critical market segment to grow would be advantageous.

Accordingly, it would be advantageous to provide materials, panel dimensions and various enhanced features of a solar energy system that improve the overall thermal efficiency of the solar panels and thus the system.

BRIEF SUMMARY OF THE INVENTION

The present invention is a solar energy system, and one major innovation is the use of photovoltaic cells in conjunction with solar panels made up of a "bladder" of thin plates of a metal material, such as aluminum, to capture energy (heat) during co-generation of electricity. The solar panels heat the fluid that passes through a turbulence channel formed between thin, planar plates.

The plates are both formed of a heat conductive metal or polymer and are oriented in parallel planes with a channel formed between the plates. The plates are affixed together and one plate has an outer flat surface with photovoltaic cells affixed thereto while the other plate has elongated indentations that control the flow of liquid passing through the channel to enhance the heat conduction between the liquid and the plates. These indentations also serve to control the volume of fluid in the panels where weight is an issue. The ability to control the volume also serves to maximize thermal transference from the PV cells (which get hot generating electricity) to the working fluid within the aforementioned "bladder" by both causing "designed turbulence" as well as forcing the fluid through the panel for even heat absorption throughout the entire area of the panel.

The fluid is introduced into and recovered from the channel by means of header assemblies. The header assemblies are comprised of upper and lower flanges with an end manifold sandwiched therebetween. The end manifold has a plurality of nozzles spaced substantially or fully along the length of opposed edges of the plates and in communication with the channel between the plates. As such, the fluid is introduced and removed from the channel in a smooth, even flow. One of the headers acts as an inlet for the fluid into the channel and the other acts as an outlet for the removal of the fluid after it has passed through the channel.

The size of the nozzles in the inlet header is, in the exemplary embodiment, controllable so that the inlet flow can be increased or decreased by an operator to optimize the overall system when used in an array with multiple panels. In addition, the overall or cumulative openings of the nozzles in the outlet header removing fluid from the channel is larger than the overall or cumulative openings in the inlet header so as to maintain a smooth flow through the channel without creating a back-up.

The present solar panels can be produced easily and inexpensively and, further are easy to assemble. The ease of manufacture and assembly of the present solar panels provides great advantages in the use of solar panels for producing heat, heated water and electricity (10% greater annual electricity production vs. similar PV cell panel without this technology).

Other features of the present solar energy system will become more apparent in light of the following detailed description of a preferred embodiment thereof and as illustrated in the accompanying drawings.

DETAILED DESCRIPTION OF THE INVENTION

Figure 1:
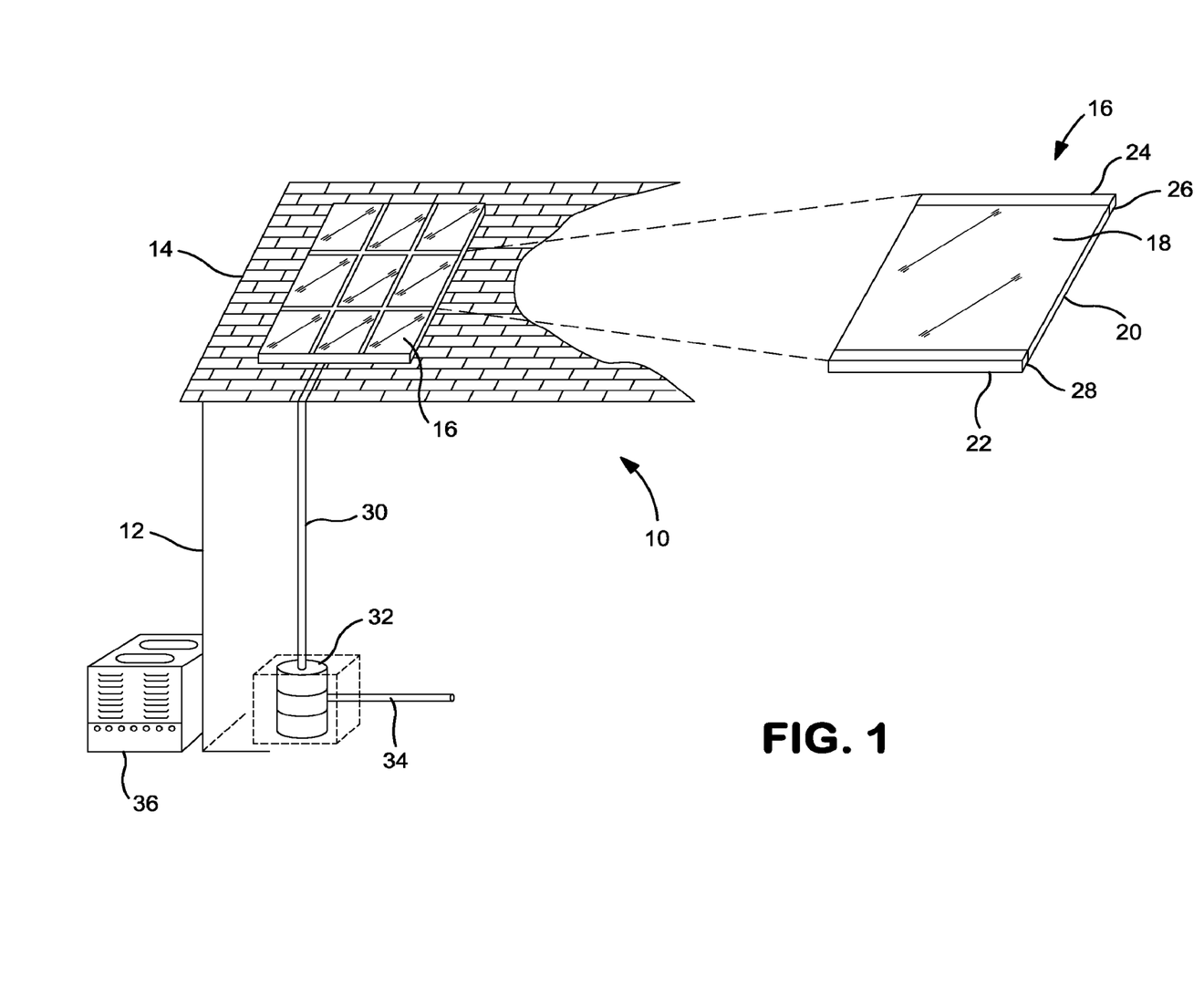
FIG. 1 is a schematic view of a solar energy system constructed in accordance with the present invention.

Turning first to FIG. 1, there is shown a schematic view, partially exploded, illustrating a solar energy system 10 constructed in accordance with the present invention. As can be seen, there is a building structure 12 with a roof 14 with an exposure to some form of sunlight, albeit direct or indirect. The building structure 12 can, of course, be any type of building that has a need for electricity and/or heated water. As will be seen, the present invention can be used with a structure that is devoted entirely to the production of heat, heated water and/or electricity i.e. a dedicated structure or frame and not serve any other purpose such as for inhabitants or a structure for housing occupants.

As seen in FIG. 1, the roof 14 has a plurality of solar panels 16 arranged in columns (vertical alignment) and in rows (lateral alignment). As shown, there are nine (9) solar panels 16, however, as will become clear, the number of panels, their size and orientation may vary depending upon the particular installation, including the heat, heated water and/or electricity requirements thereof. With a modular design, a single panel can be used, or two or more, easily connected together to provide sufficient solar energy needs for the structure on which they are placed.

The solar panels 16 may be affixed to the roof 14 in a conventional manner allowing for a circulation of air between the solar panels 16 and the roof 14 or may be directly affixed flush to the roof 14. If installed directly to the roof of a structure, there can be insulating material interposed between the solar panels and the roof. As also noted in FIG. 1, there is an exploded solar panel 16 that is comprised of a first plate 18 and a second plate 20.

As can be seen, the first plate 18 is in an upper position with respect to the second plate 20 and the solar panel 16 also includes an inlet header assemblies 24 and an outlet header assembly 22, that will be later explained, however, the inlet and outlet header assemblies 24 and 22 include an inlet 26 and an outlet 28, respectively, for the introduction of a liquid into the solar panel 16 and for the removal of liquid from the solar panel 16 after the liquid has passed through the solar panel 16.

In the embodiment as shown, the inlet 26 in each solar panel 16 is oriented so as to be higher than the outlet 28 with respect to the ground so that the passage of liquid through a solar panel 16 is in a downward direction thereby aided by gravity. That is also true if there are multiple panels, that is, the cold liquid enters the upper panel or panel and then progresses in the downward direction to the lower solar panel or panels. While the liquid may be water that passes through the solar panel 16, other fluids could be used, including, but not limited to, ethylene glycol or even air. In the present description, the medium will hereafter be referred to as a liquid for convenience.

As is conventional, the liquid circulates through the solar panels 16 where it is heated by the radiant energy of the sun and the heat generated by photovoltaic cells in the solar panels themselves. In the exemplary embodiment of FIG. 1, the first plate 18 is the upper position and faces the sun while the second plate 20 is in the lower position and faces the roof 14. The heated liquid can pass through a suitable pipe 30 (closed loop system) to a heat-exchanger in reservoir 32. The reservoir 32 can also be of the modular type where additional capacity can be added or the capacity reduced by the user or the designer by stacking (with suitable connectors) and/or using multiple stacked units depending upon the configuration required. In any event, the heated liquid is stored and accumulated in the reservoir 32 to be used for some end purpose through a discharge pipe 34.

The solar energy system 10 can also include a heating system 36 to provide heat, when needed, so as to maintain the liquid in the reservoir 32 at a predetermined temperature. One type of heating system 36 can be a heat pump; however other systems can be used to maintain that predetermined temperature. The heating system 36 is the only component that will not be intrinsically modular; however several sizes/capacities (output) are readily available depending on the configuration required.

Figure 2:
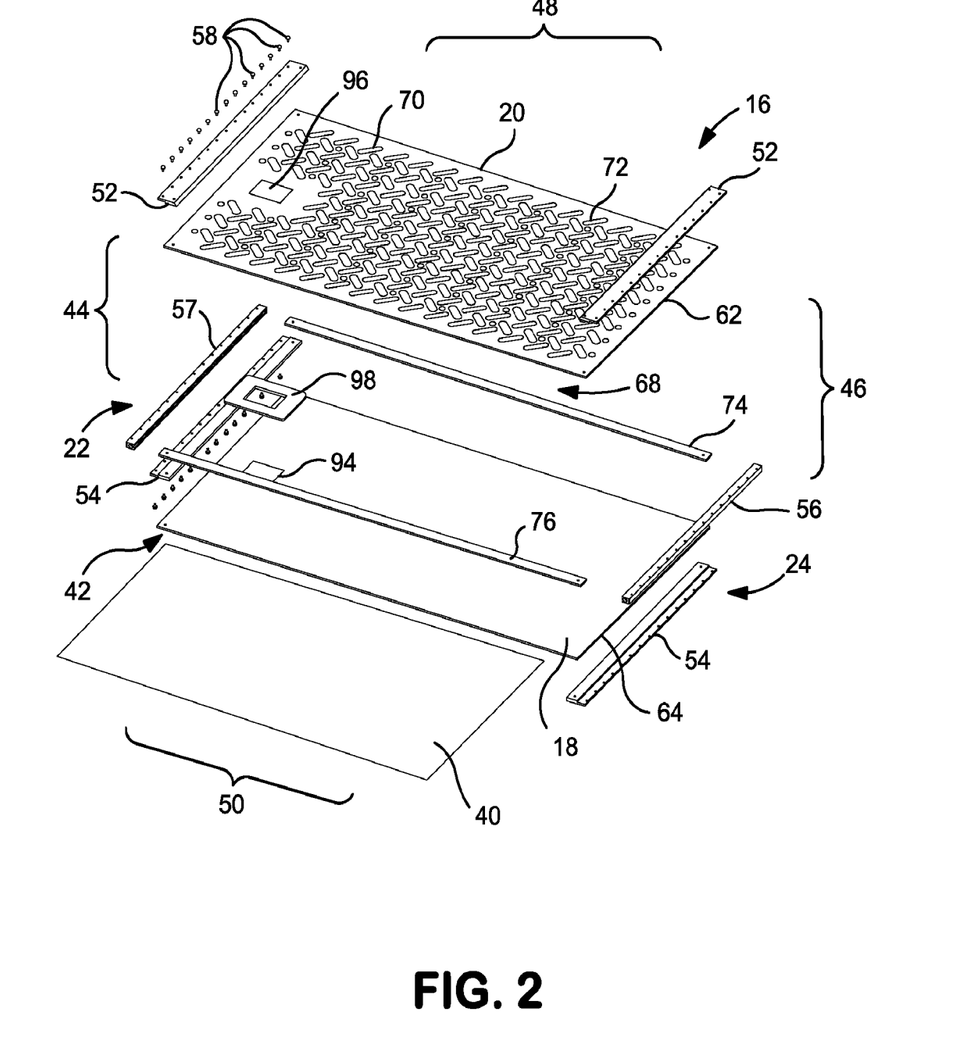
FIG. 2 is an exploded view of a solar panel of the present invention.

Turning now to FIG. 2, taken along with FIG. 1, there is shown an exploded view of a solar panel 16 and illustrating the construction of an individual solar panel 16 of an exemplary embodiment. As can be seen, the solar panel 16 of FIG. 2 is constructed by the use of two, generally planar plates, i.e. the first plate 18 and the second plate 20. As can be seen in FIG. 2, the solar panel 16 is inverted from its normal orientation in use, that is, the first plate 18 is in the lower position with the second plate 20 atop thereof whereas in normal use, the first plate 18 is in the upper position, however, the solar panel 16 is inverted in FIG. 2 in order to better illustrate the particular construction of the second plate 20.

Accordingly, when in use, the uppermost component is the photovoltaic cell 40 (PV cell) or cells and which is conventional and faces the sunlight to receive radiant energy to produce electricity. The PV cell 40 is affixed to the upper surface 42 of the first plate 18 and may be affixed there to by an adhesive or by laminating. PV cells that are usable with the present solar panels are readily commercially available and one of the advantages of the present solar panel is that a PV cell need not be customized but can be almost any ones of the commercial PV cells currently available.

A typical commercial encapsulated PV cell can be obtained as a unit with a glass cover to desired dimensions and can be a single PV cell that covers all or substantially all of the area of the upper surface 42 of the first plate 18. As noted, the upper surface 42 of the first plate 18 is a generally planar surface so that the PV cell 40 uniformly covers that surface to enhance the transfer of heat.

In FIG. 2, the solar panel 16 is configured as a rectangle having ends 44, 46 and sides 48, 50, however, it can be seen that other geometrical shapes could be used. As noted, the ends 44, 46 of the solar panel 16 are secured by the inlet and outlet header assemblies 24, 22. In the exemplary embodiment, inlet header assembly 24 is used to introduce a liquid through the solar panel 16 via the inlet 26 (FIG. 1) while outlet header assembly 24 is used to remove liquid from the solar panel 16 via outlet 28 (FIG. 1)

As thus can be seen in FIG. 2, while, as will be later explained, the inlet and outlet header assemblies 24, 22 are basically different in certain respects, each include an upper flange 54 and a lower flange 52. In addition, there is an inlet manifold 56 and an outlet manifold 57. In the making of the inlet and outlet header assemblies 24, 22, the upper and lower flanges 54, 52 are secured together with the inlet and outlet manifolds 56, sandwiched therebetween.

Figure 3:
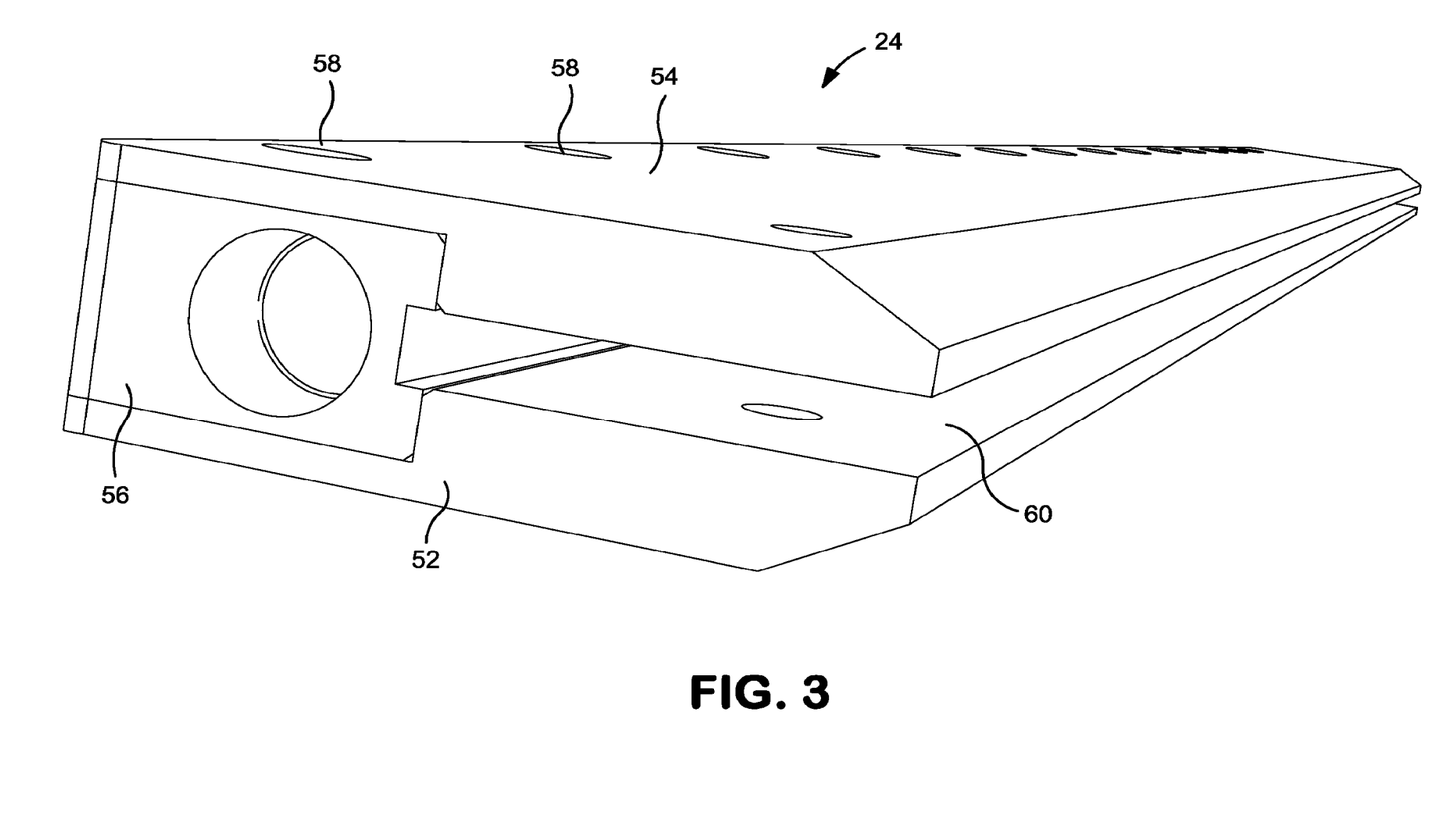
FIG. 3 is a perspective view of the inlet header assembly used with the present solar panel.

In FIG. 3, taken along with FIG. 2, there is a perspective view of a completed inlet header assembly 24 and includes the common components of both the inlet and outlet header assemblies 24, 22, taken along with FIG. 2. Accordingly, describing the inlet header assembly 24, there can be seen the upper flange 54, the lower flange 52 and the inlet manifold 56 positioned therebetween. Assembly of the inlet header assembly 24 can be carried out by fasteners 58 that may be screws, rivets or other fastening devices. As also can be seen, an elongated slot 60 is formed in the inlet header assembly 24 when fully assembled together that receives the end edges 62, 64 of the first and second plates 18, 20 after they have been affixed together as will be later explained.

As explained both the inlet and outlet header assemblies 24, 22 are similar with the exception that a manifold that is sandwiched between the upper flange 54 and the lower flange 52 and that manifold is difference between the inlet and outlet assemblies 24, 22.

Figure 4A:
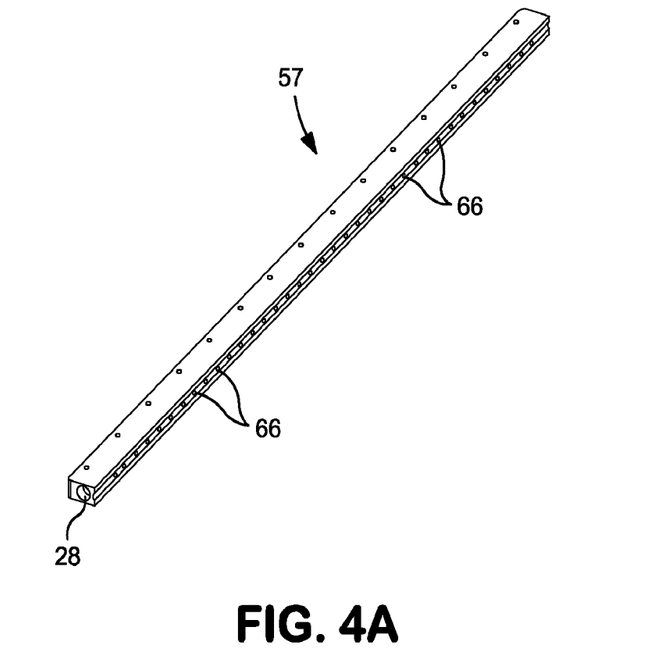
FIG. 4A is a perspective view of the outlet manifold used in construction of an outlet header assembly of the present solar panel and FIG. 4B is an enlarged side view of the outlet manifold.
Figure 4B:
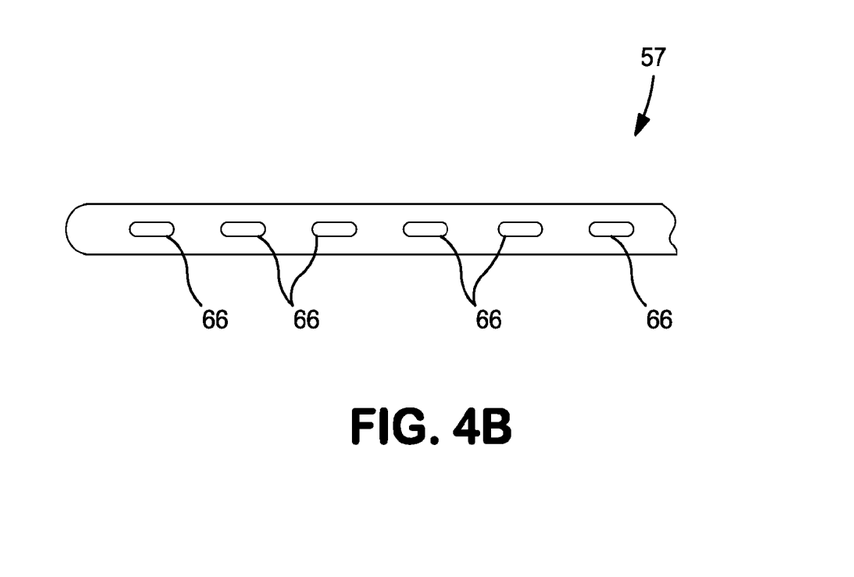

Taking then FIGS. 4A and 4B, there is shown a perspective view and a front view of the outlet manifold 57 and, as can be seen, it includes the outlet 28 that provides a discharge means for liquid exiting an elongated passageway within the outlet manifold 57. A plurality of outlet nozzles 66 are formed in the outlet manifold 57 and each outlet nozzle 66 communicates with the elongated passageway within the outlet manifold 57 such that a liquid exiting through the outlet 28 is received uniformly into of the plurality of outlet nozzles 66.

In FIG. 4B, it can be seen that, in the exemplary embodiment, the outlet nozzles 66 are elongated or oval in shape and can be distributed uniformly along the outlet manifold 57.

Figure 5:
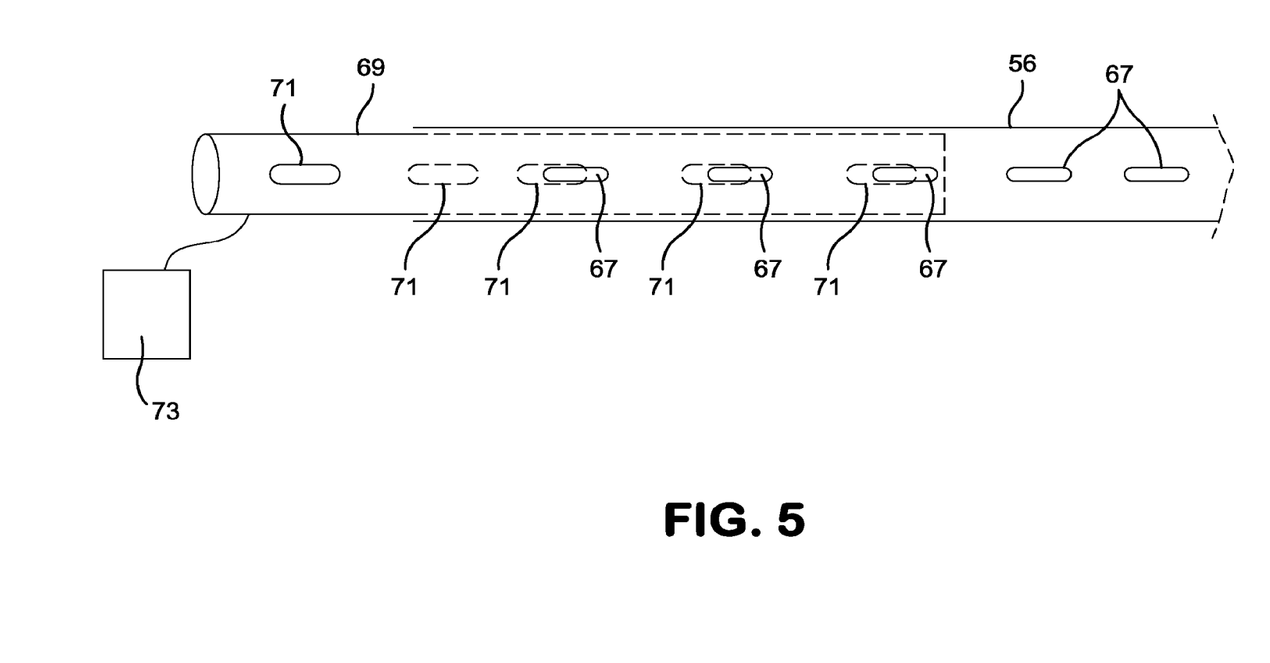
FIG. 5 is a schematic view illustrating the inlet manifold of the present invention.

Turning then to FIG. 5, there is a schematic view of the inlet manifold 56. As can be seen, the inlet manifold 56 has a plurality of elongated inlet nozzles 67 similar to the outlet nozzles 66 of FIGS. 4A and 4B, however there is also a sleeve 69 that slides within the inlet manifold 56 and the sleeve also has a plurality of openings 71 spaced apart the approximately (slightly further apart) the same distance as the inlet nozzles 67 and of a similar size. As such, to alter the flow of liquid through the inlet manifold 56, the sleeve can be moved axially with respect to the inlet manifold 56 so that more or less of the openings 71 are in alignment with the inlet nozzles 67.

Accordingly, when the sleeve 69 is moved to a position where the openings 71 are fully in alignment with the inlet nozzles 67, maximum liquid can pass through the inlet manifold 67. As the sleeve 69 is then moved axially, the openings 71 will be in lesser alignment with the inlet nozzles 67 and the effective cumulative opening of the inlet nozzles 67 is reduced, thus reducing the flow through the inlet manifold.

In that manner, the flow though the inlet manifold 56 can be controlled by an operator and there can be some mechanism 73 to manually or automatically cause the axial movement of the sleeve 69.

Returning to FIG. 2, in the assembly of the solar panel 16, the first and second plates 18, 20 are affixed together to form therebetween, a channel 68 for the passage of liquid through the solar panel 16. As described with respect to the inlet and outlet header assemblies 24, 22, once the first and second plates 18, 20 are affixed together as will be explained, the combination fits into the elongated slot 60 (FIG. 3) in the inlet header assembly 24 and an identical elongated slot in the outlet header assembly 22 so that the outlet nozzles 66 of outlet header assembly 57 and the inlet nozzles in the inlet header assembly 24 22 can communicate with the channel 68. As such, the plurality of inlet nozzles 67 located substantially along or fully along the width of the inlet header assembly 24 introduces liquid into the channel 68 and the outlet nozzles 66 located substantially along or fully along the width of the outlet header assembly 22 removes liquid from the channel 68 so as to create a smooth even flow of the liquid through the channel 68.

Contributing to the smooth flow is the feature that the overall opening cumulative area of the outlet nozzles 66 is designed to be larger that the cumulative area of the inlet nozzles 67 so as to prevent a back up of flow through the channel 68

The flow of the liquid is further enhanced by the use of indentations 70 in the second plate 20 that protrude into the channel 68. The indentations 70 are uniformly distributed over the second plate 20 and extend into the channel 68 but do not extend all the way through the channel 68 so as to contact the first plate 18. In that manner, the indentations 70 allow the liquid passing through the channel 68 to occupy the entire area of the lower plate 20 for maximum heat transfer as well as coax the liquid to flow through the narrow space, instead of taking the fastest route (possible caused by slope, or easiest flow path) and the indentations 70 also serve to manage the quantity of liquid passing through the solar panel 16.

Figure 6A:
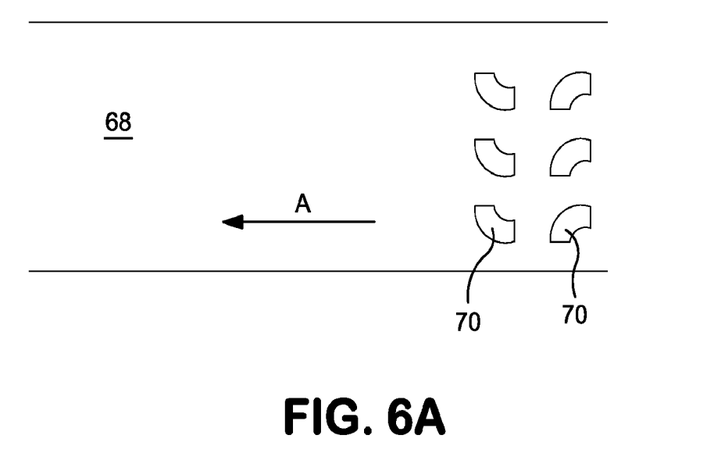
FIG. 6A is a schematic view illustrating the shape and orientation of indentations used in the main fluid channel of the present and FIG. 6B is a side view of those indentations.
Figure 6B:
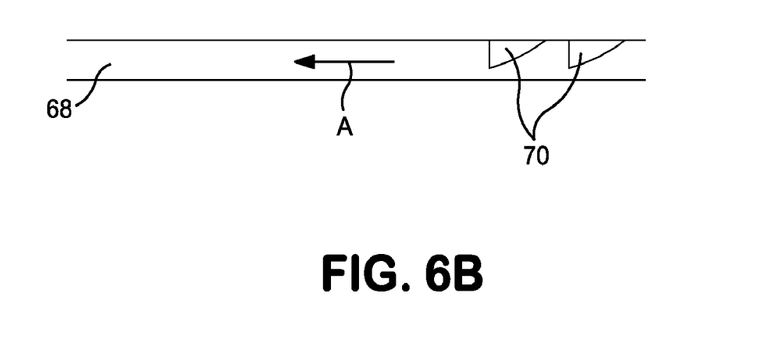

Turning to FIGS. 6A and 6B, taken along with FIG. 2, there is a top view and side view showing the channel 68 and an exemplary embodiment illustrating the shape and orientation of the indentations 70. As can be seen, the indentations 70 are arranged in rows (parallel to the direction of flow of the liquid illustrated by the arrow A) of FIG. 6A and columns (normal to the flow of liquid).

The indentations 70 can further be described as spiral shaped with the ends of the spiral oriented so as to be normal to the direction of flow through the channel 68. In addition, as seen in FIG. 6B, one end of the spiral indentations 70 increasingly projects into the channel 68.

Figure 7:
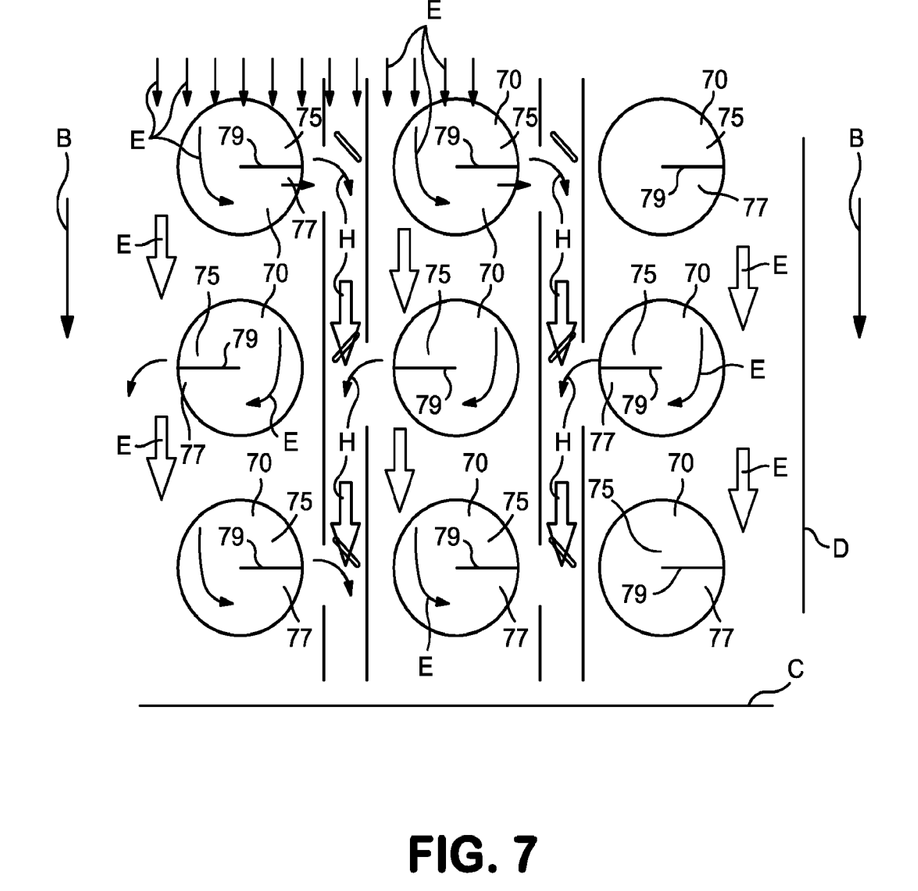
FIG. 7 is a further schematic view illustrating the shape and orientation of the indentations.

Turning to FIG. 7, there is a schematic view illustrating the shape and orientation of the indentations 70. In FIG. 7, the direction of the flow of fluid is indicated by the arrows B. As can be seen, the indentations 70 are arranged in rows normal to the direction of flow, as indicated by the line C and columns indicated by the line D that are parallel to the flow of fluid.

The indentations 70 are basically one circle or 360 degrees of a spiral coil where one end 75 of the coiled indentation 70 is basically even with the planar surface of the second plate 20 and the other or leading end 77 is displaced outwardly, away from the planar surface of the second plate 20. As with a spiral configuration, there is a split 79 where the one end 75 and the leading end 77 of the indentations 70 are separated by a finite distance.

Accordingly, as the flow of cooler fluid, shown by the arrows E enters the channel 68 and a portion of the flow is diverted by the indentations 70 and is heated so as shown by the arrows H while forming a swirling pattern of flow and thus enhancing the heat conduction. In the exemplary embodiment the split 81 is normal to the flow of fluid and can be oriented such that the split 81 is 180 degrees offset with alternating rows. The spiral pattern of the flow of fluid forces the cascading fluid to swirl around the hot spots of the PF cell 40 (FIG. 2) so as to maximize the heat transfer to the fluid.

The indentations are 70 are pressed onto the second plate such that there is a smooth continual metal transition between the second plate 20 and the indentations 70 and no break or space therebetween.

In addition to the indentations 70, there are dimples 72 formed in the second plate 20 that, again, extend inwardly and are uniformly distributed on the second plate 20. The dimples 72 extend inwardly through the channel 68 to contact the first plate 18 and a laser weld is made at the point of contact so as to secure the first and second plates 18, 20 together. The use of the dimples 72 has two functions, that is, the dimples 72 keep the first and second plates 18, 20 equally spaced apart throughout the solar panel 16 such that the channel 68 has a uniform depth and also the use of the laser welded dimples 72 keeps the first and second plates 18, 20 from bulging in the case of an unexpected expansion. That expansion can, however, also be controlled by a safety valve and/or industry standard "drop back" system.

As further components of the solar panel 16, there are side members 74, 76, again which may be comprised of a metal such as aluminum, and which are positioned along the sides 48, 50 of the solar panel 16 between the first and second plates 18, 20 to seal the sides 48, 50 and prevent the leakage of liquid from the channel 68. The sides 48, 50 can be laser welded to the side members 74, 76 at retain the side members 74, 76 in the desired positions.

Figure 8:
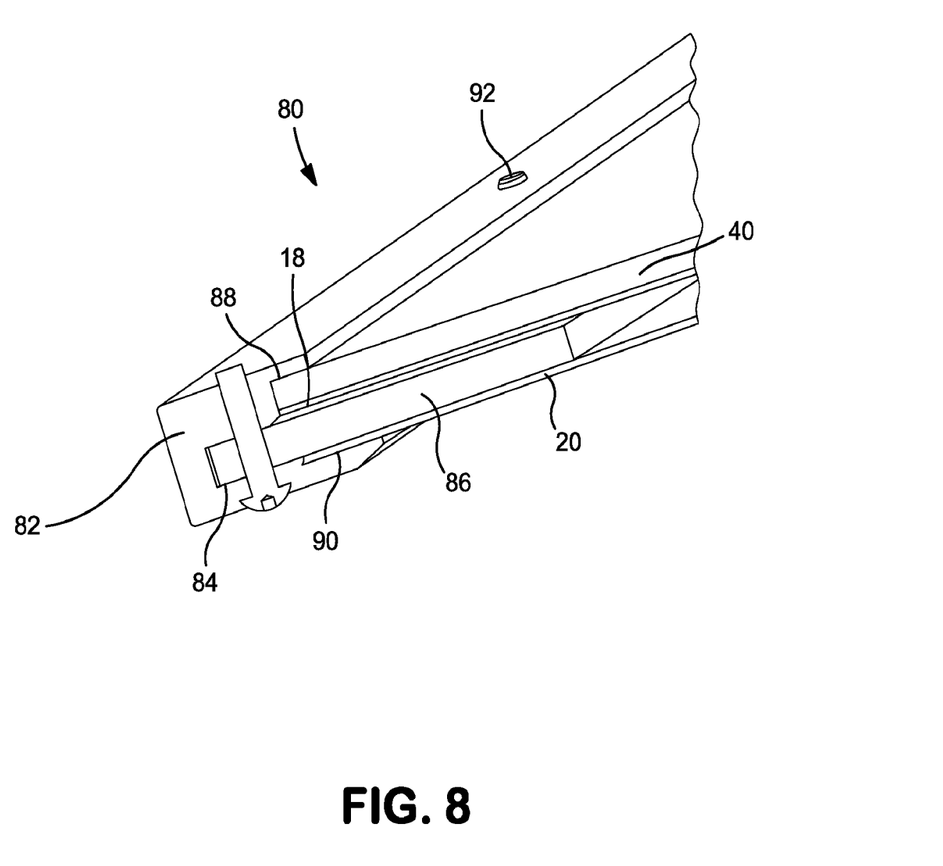
FIG. 8 is a perspective view illustrating a side support assembly used with the solar panel of the present invention.

In FIG. 8, taken along with FIG. 2, both side members 74, 76 may be constructed as a side support assemblies 80 that can be used to strengthen the solar panel 16. Since the side support assemblies are the same along each side 48, 50 of the solar panel 16, only one will be described. As such the side assembly 80 includes an outer edge extrusion 82. The edge extrusion 82 has a main channel 84 for retaining a side seal 86 that, as with the side members 74, 76, is interposed between the first and second plates 18, 20 to provide a seal therebetween.

As also can be seen, the PV cell 40 is affixed within a recess 88 in the edge extrusion 82 along with the first plate 18. In a similar manner, the second plate 20 also fits within a recess 90 in the edge extrusion. Fastening devices 92, such as screws or rivets pass through the edge extrusion 82 to retain all of the components together.

Returning to FIG. 2, as a further feature of the solar panel 16, there is an opening 94 formed in the first plate 18 and an opening 96 formed in the second plate 20 that are in alignment when the first plate 18 has been affixed to the second plate 20 as previously described. A gasket 98 is provided intermediate the openings 94, 96 to seal between the first and second plates 18, 20. As such, the openings 94, 96 provide a through opening in the solar panel 16 for the passage of electrical wiring or other utility needs.

All these components will be able to be computer-configured (for estimation and installation instructional purposes) based on user input (size of area to be heated, hot water usage, number of people, structure size, insulation level, geographic region, etc.) and all pertinent data also available based on this input such as configuration, size, efficiencies, estimated savings (based on user input), etc.

Further, these solar panels provide sufficient hot water which is maintained at a constant temperature in a reservoir of sufficient capacity. Instead of firing up alternative fuel-driven heating units when the temperature drops several degrees, the unit is designed to maintain a constant predetermined temperature, eliminating the inefficient 'peaks and valleys' in favor of a more efficient temperature maintenance. Additional (modular) solar panels can be added to provide for sufficient heat/hot water or co-generation of electricity, within the modular design.

Thus, the smallest common denominator, the size appropriate for a small garage, for example, will be the basic size of each modular solar panel unit, and larger sizes can be assembled by easily adding more of these modular units together.

The construction details of the invention as shown in FIG. 1-5 are that the system configuration can be adapted to any size construction. The materials used will be appropriate for exposure (rooftop) and ideally suited for all climates and conditions. In addition, the units can be easily configured and installed into new construction as easily as retro-fitting into existing structures. In essence, the solar panel includes a bladder comprised of two aluminum sheets bonded together allowing the working fluid to flow in a thin "sheet" evenly across the entire back of the panel, now only separated by a thin aluminum wall, thereby cooling the entire array of PV cells more efficiently and extracting more heat for hot-water in the process.

The two sheets of aluminum can be laser-welded for a water-tight seal and laser-welded internally to maintain proper spacing (fluid volume control) and to prevent expansion (in addition to a safety pressure valve). The invention is used to further manage the total volume of fluid within the panel during operation as well as to coax the fluid into an even flow across the full plane of the panel. The design forces the fluid over the hottest areas of the PV layer, with natural acceleration, enabling more efficiency in cooling and more heat extracted for generating hot water.

In broad embodiment, the present invention is a unique multi-dimensional solar panel system incorporating solar panels to heat water and PV cells to generate electricity using innovative materials, dimensions and construction. Additionally the present invention is totally modular in concept for extremely easy installation and maintenance.

While the foregoing written description of the invention enables one to make and use what is considered presently to be the best, most convenient, most configurable and in all ways the most advantageous solar system thereof, those of any skill level will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A modular solar panel to heat a fluid using sunlight comprising:
   a first, generally planar plate having a perimeter and comprised of a heat conductive material,
   a second, generally planar plate having a perimeter and comprised of a heat conductive material, the second planar plate affixed to the first generally planar plate and oriented in a plane generally parallel to a plane of the first generally planar plate,
   the first and second generally planar plates being affixed together at their perimeters in a fluid tight relationship forming one channel therebetween, the one channel having an inlet for fluid to be introduced into the one channel and an outlet for discharging fluid from the one channel,
   the second generally planar plate having a plurality of indentations formed therein indented toward the first, generally planar plate to control the flow of fluid passing therethrough; and
   a photovoltaic cell affixed in heat conducting relationship to the first generally planar plate;
   wherein the plurality of indentations extend partially into the one channel and do not contact the first plate; and
   wherein the indentations comprise generally spiral coil indentations where first ends of the spiral coil indentations are substantially even with a planar surface of the second generally planar plate, where second ends the spiral indentation are displaced outwardly from the second generally planar plate, and where the first ends and the second ends are displaced from each other by a finite distance.

2. The modular solar panel of claim 1 wherein the inlet is positioned at an elevation higher than the outlet.

3. The modular solar panel of claim 1 wherein the first and second generally planar plates are both comprised of a metal.

4. The modular solar panel of claim 3 wherein the first and second generally planar plates are both comprised of aluminum.

5. The modular solar panel of claim 1 wherein the inlet includes a header that extends along the inlet of the channel, the header having an plurality of nozzles that communicate with the one channel, the nozzles being formed at least substantially all along the length of the header to introduce a fluid uniformly into the one channel.

6. The modular solar panel of claim 5 wherein nozzles are elongated.

7. The modular solar panel of claim 1 further including a control mechanism to control the flow of fluid through the nozzles.

8. The modular solar panel of claim 7 wherein the control mechanism controls the size of the nozzles.

9. The modular solar panel of claim 5 wherein the header has an elongated opening therein communicating fluid with each of the nozzles and a sleeve is movable with the elongated opening to control the flow through the inlet nozzles.

10. The modular solar panel of claim 9 wherein the sleeve has a plurality of holes formed therein shaped substantially similar to the inlet nozzles and the movement of the sleeve moves the holes between a position where the holes are at least substantially in alignment with the inlet nozzles and a position where the holes are offset with respect to the inlet nozzles.

11. The modular solar panel of claim 1 wherein the spiral indentations are oriented in columns aligned in the direction of the flow of fluid through the one channel and rows generally normal to the flow of fluid through the one channel;
    wherein the second end of each spiral indentation within a particular row are oriented in the same direction relative to the direction of fluid flow through the one channel; and
    wherein the rows alternate between a first row configuration with the second end of the spiral indentations being oriented in a first direction and a consecutive row configuration with the second end of the spiral indentations being oriented in a second direction 180 degrees from the first direction, such that each row has an opposite second end leading edge configuration from immediately adjacent rows.

12. The modular solar panel of claim 1 wherein the second ends of the spiral indentations are oriented downstream in the flow of fluid through the one channel.

13. A method of constructing a solar panel comprising the steps of:
    providing a first, generally planar plate having a perimeter and comprised of a heat conductive material,
    providing a second, generally planar plate having a perimeter and comprised of a heat conductive material and having elongated spiral indentations therein,
    affixing the second generally planar plate to the first generally planar plate so as be in a plane oriented generally parallel to the plane of the first generally planar plate to form one channel therebetween with the elongated indentations facing toward the first planar plate,
    sealing the perimeter of the first plate to the perimeter second plate while leaving a fluid inlet and a fluid outlet to the one channel,
    affixing a photovoltaic cell to one of the planar plates in heat conducting relationship;
    wherein the plurality of the elongated spiral indentations extend partially into the one channel and do not contact the first plate; and
    wherein the elongated spiral indentations comprise generally spiral coil indentations where first ends of the spiral coil indentations are substantially even with a planar surface of the second generally planar plate, where second ends the spiral indentation are displaced outwardly from the second generally planar plate, and where the first ends and the second ends are displaced from each other by a finite distance.

14. The method of claim 13 wherein the step of sealing the perimeter of the first plate to the second plate while leaving a fluid inlet and a fluid outlet to the one channel comprises orienting the fluid inlet to be at an elevation higher than the fluid outlet.

15. A structure having a plurality of solar panels affixed thereto and oriented to face the sun, each solar panel comprised of;
    a first, generally planar plate having a perimeter and comprised of a heat conductive material,
    a second, generally planar plate having a perimeter and comprised of a heat conductive material, the second planar plate affixed to the first generally planar plate and oriented in a plane generally parallel to a plane of the first generally planar plate,
    the first and second generally planar plates being affixed together at their perimeters in a fluid tight relationship forming one channel therebetween, the one channel having an inlet for fluid to be introduced into the one channel and an outlet for discharging fluid from the channel,
    the second generally planar plate having a plurality of indentations formed therein indented toward the first, generally planar plate to control the flow of fluid passing therethrough; and
    a photovoltaic cell affixed in heat conducting relationship to the first generally planar plate;
    wherein the plurality of indentations extend partially into the one channel and do not contact the first plate; and
    wherein the indentations comprise generally spiral coil indentations where first ends of the spiral coil indentations are substantially even with a planar surface of the second generally planar plate, where second ends the spiral indentation are displaced outwardly from the second generally planar plate, and where the first ends and the second ends are displaced from each other by a finite distance.

16. The structure of claim 15 wherein the inlet for introducing fluid into the one channel is a variable opening inlet to vary the flow through the one channel.

17. The structure of claim 16 wherein the outlet is larger than the variable opening in the inlet.

18. The structure of claim 15 wherein the plurality of solar panels comprises at least a first row of solar panels and a second row of solar panels at an elevation lower that the first row of solar panels, the first row of panels having an inlet and the second row of solar panels having an outlet and wherein the fluid can pass from the inlet in the first row of solar panel to the outlet in the second row of solar panels.

19. The structure of claim 15 wherein the indentations create a swirling pattern in a flow of fluid passing between the inlet and the outlet.

* * * * *